July 23, 1963     F. MATHIEU     3,098,409

FILM PROJECTOR DEVICES

Filed Aug. 15, 1960     6 Sheets-Sheet 1

July 23, 1963 F. MATHIEU 3,098,409
FILM PROJECTOR DEVICES
Filed Aug. 15, 1960 6 Sheets-Sheet 2

July 23, 1963   F. MATHIEU   3,098,409
FILM PROJECTOR DEVICES

Filed Aug. 15, 1960   6 Sheets-Sheet 4

United States Patent Office 3,098,409
Patented July 23, 1963

3,098,409
FILM PROJECTOR DEVICES
Frédéric Mathieu, Paris, France, assignor to Compagnie d'Application Mecaniques a l'Electronique, Au Cinema et a l'Atomistique (C.A.M.E.C.A.), a corporation of France
Filed Aug. 15, 1960, Ser. No. 49,770
Claims priority, application France Aug. 31, 1959
9 Claims. (Cl. 88—17)

The present invention relates to motion picture projectors. More particularly it relates to a device for selectively projecting on a screen any one of a plurality of films which are stored in the device.

A device of this type comprises a magazine for storing the films among which the user is to make his choice, a projector apparatus and means for selectively positioning a film for projection and for returning the selected film into the magazine once the projection has been completed. The device may be of the pre-payment type, i.e. the starting thereof may be controlled by the insertion of a token or of a coin.

The device according to the invention comprises a projector, arranged for laterally receiving the films to be projected, a magazine, shaped as a lantern, mounted for rotation about its vertical axis and arranged for vertically supporting along the periphery thereof a plurality of films ready for projection, means for selectively bringing said films into the projection position within said projector, the portion of said projector carrying the projector lamp being pivotally mounted on the body of the projector which is located outside the lantern and adapted to be located, in its rest position, entirely within said magazine, leaving the same free to rotate, and for maintaining, when brought in its operative position, the selected film in its projection position within said projector.

The invention will be best understood from the following description and appended drawing, wherein.

According to the embodiment illustrated, a device according to the invention comprises a casing 1 within which a film magazine 2 and a film projector 3 are located.

Figure 5:
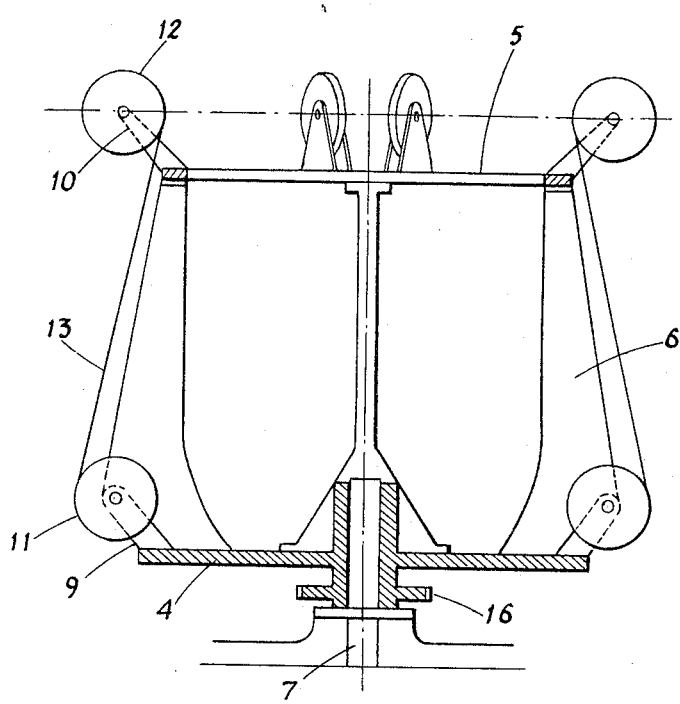
FIG. 5 illustrates the magazine.

The magazine, which is shown in more detail in FIG. 5, comprises a plate 4 and a top ring 5, which are connected by uprights 6, thus building up a cup or lantern like structure. Plate 4 is mounted for rotation about a pivot 7, coaxial therewith and secured to the base 8 of casing 1. Plate 4 and ring 5 carry, respectively, brackets 9 and 10 which are directed outwardly. Film delivery reels 11 and film take-up reels 12 are respectively supported by brackets 9 and 10. The films 13 are normally wound on reels 11, the free end of the film being secured in the usual manner to the corresponding take-up reel 12.

Figure 6:
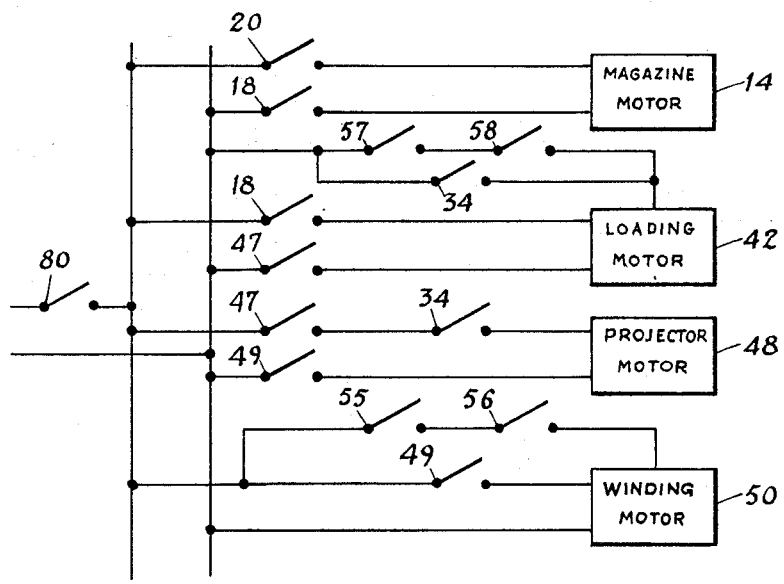
FIG. 6 is a schematic diagram of the device.

The magazine is rotated by a motor 14 (FIG. 1), for example through a worm gear 15 and a ring gear 16 mounted underneath plate 4 and integrally connected thereto. Motor 14 is controlled by means of a film selector knob 17, the angular position of which defines in a known manner the angular travel of magazine 4, this travel being defined by the angular position of the film which it is destired to insert in the projector when putting the device in operation. Motor 14 is arranged for opening, at the end of the travel, a switch 18 (FIGS. 1 and 6) which stops the motor. The starting of the motor is made dependent in any known manner on the insertion of a coin or token into a collector box 19 and the manual closing of a contact 20 (FIG. 6).

The projector, except for the details which will be described hereinafter, is entirely conventional. It may be, for instance, of the RC 16 type, which is manufactured by the assignee of the present application. This projector is of the continuously running type, which presents certain definite advantages such as reduced wear of the film at the perforations thereof, absence of wear on the emulsion carrying face in the gate since no crushing effect is exerted on the film, etc.

Figure 1:
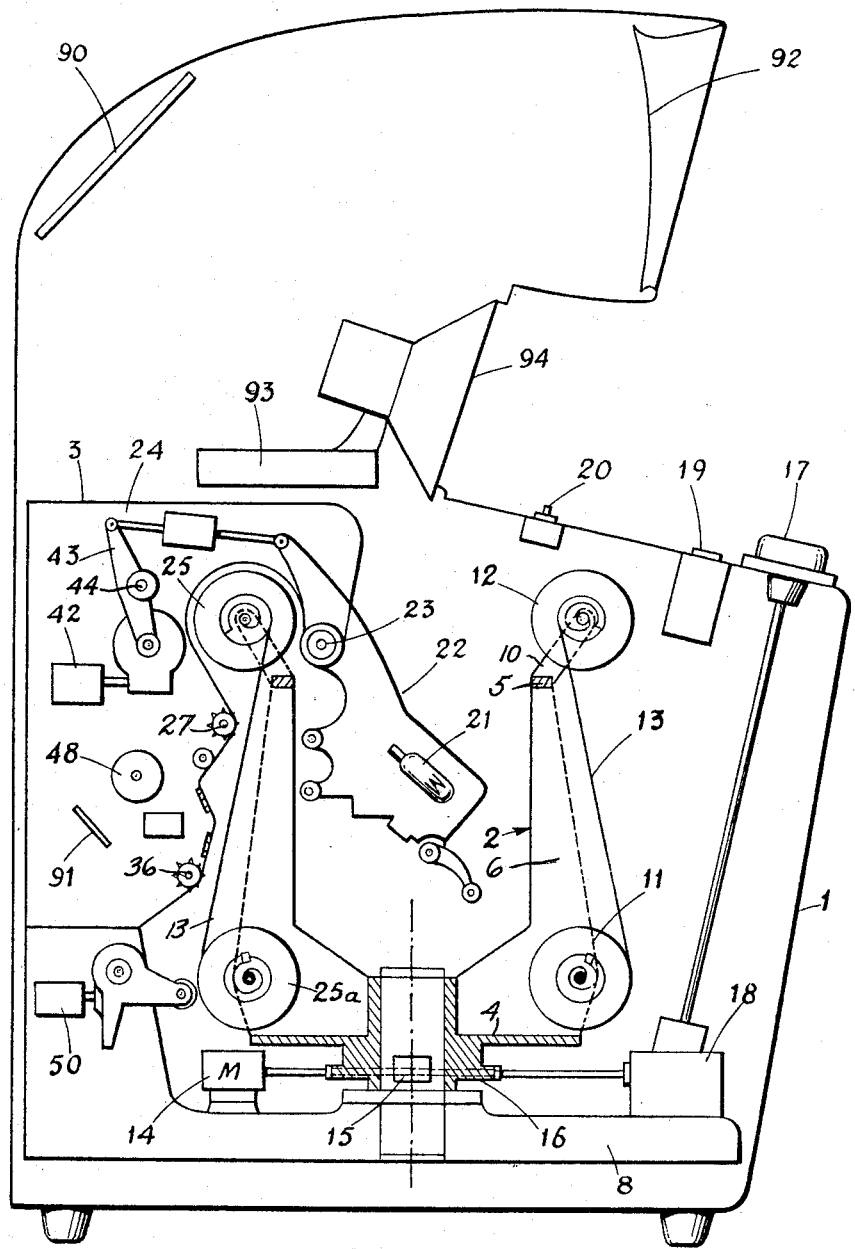
FIG. 1 shows, very diagrammatically and partly in section, a device according to the invention.

The projector used in the device of the invention is arranged to receive the film selected and brought into the loading position by the rotation of magazine 2. To this end, the portion of the projector comprising the projection lamp 21, or more generally the entire portion of the apparatus located behind the film (at the right hand side thereof as shown in the drawing), forms an arm 22 which will be hereinafter called the loading arm. This arm is pivotally mounted on a pivot 23 secured in the frame 24 of the projector. The rest position of the loading arm 22 is that in which it is illustrated in FIG. 1. In this position, it is raised and is placed entirely inside magazine 2, which can thus freely rotate and bring the take-up reels 25 and the supply reels 25a carrying the film 13 selected by the user into operating or projection position.

Figure 2:
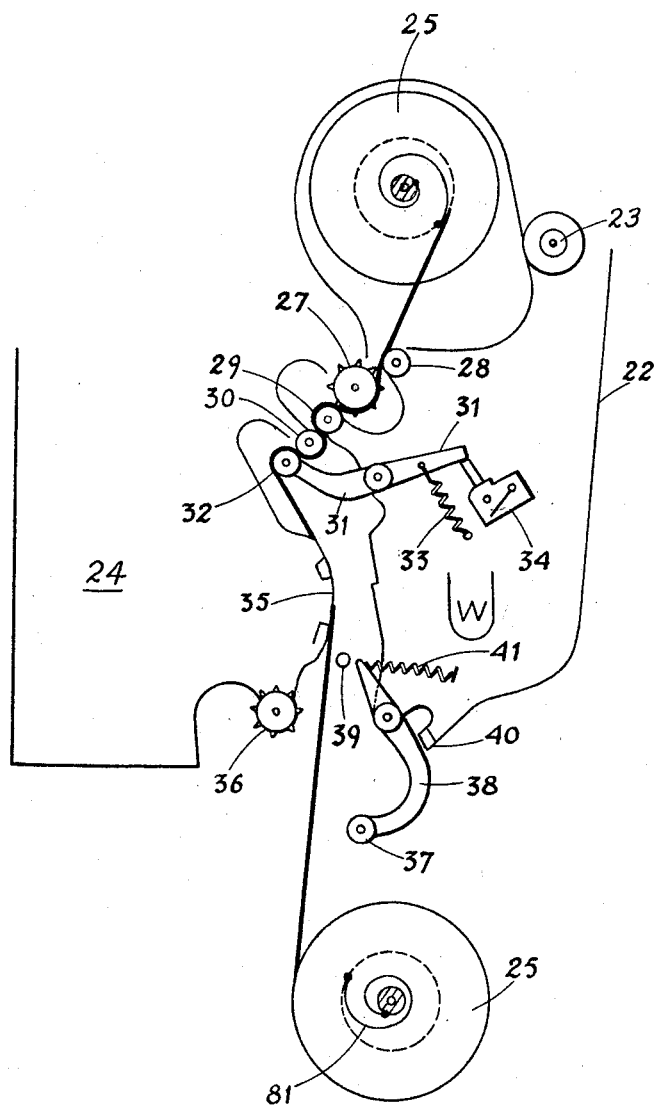
FIGS. 2 and 3 are detail views of the device with the loading arm in two different positions.
Figure 3:
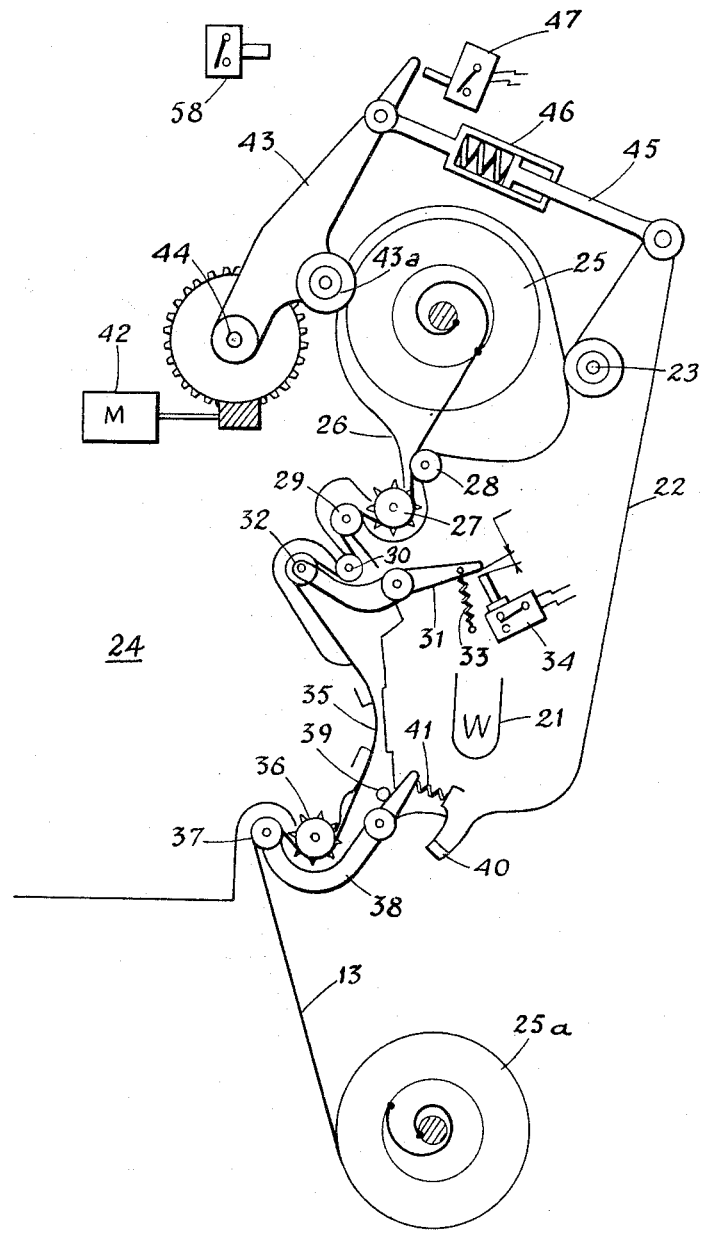

FIG. 3 shows the loading arm 22 in the operating position, with the film 13 maintained in the projection position by the arm 22. FIG. 2 shows arm 22 in an intermediate position, in the course of its displacement from the rest position to the operating position.

The loading arm 22 will now be described in more detail, with particular reference to the opposite faces of this arm and of frame 24 of the projector which cooperate in maintaining the film selected by the user in the projection position.

At their respective upper portions, frame or plate 24 and arm 22 are formed in such a manner as to leave therebetween sufficient room to accommodate the reel 25 of the film selected by the user and brought into the projection position by magazine 2 (FIG. 1).

The edge of plate 24 facing arm 22 is formed with a projection 26 on which a driving sprocket 27 is rotatably mounted (FIG. 3). On each side of sprocket 27 is a pressure roller 28 or 29 which rollers are mounted on the loading arm 22 for pressing the film adjacent sprocket 27. Underneath roller 29, frame 24 carries the sound stabilizer drum 30, on the axis of which a flywheel is mounted in the usual manner. Pivoted on the loading arm 22, is an arm 31 which carries at one end a tensioning roller 32. Arm 31 is biased towards the film by a tension spring 33, and, if the positioned film 13 is not sufficiently tensioned, arm 31 opens a switch 34 whose function will be explained later. Below roller 32 is positioned the film-track 35 which has a rounded contour. At the base of the track a sprocket 36 is located. A roller 37 is mounted at one end of an arm 38 and is adapted for wrapping the film about roller 36. Arm 38 is pivoted at the end of the loading arm 22 and the displacement thereof is limited by two stops 39 and 40. It is normally applied against stop 40 by a compression spring 41, but, when arm 22 is moved into contact with the film, its end opposite to roller 37 engages the fixed stop 39 which causes roller 37 to bear against the film.

The loading arm 22 is driven by a motor 42 (FIGS. 1 and 3). The latter drives in any known manner a lever 43 pivoted at 44 on frame 24. At the end of this lever is pivoted a rod 45 including a spring 46, the opposite end of rod 45 being pivoted on the loading arm 22.

The circuit of motor 42 is closed by switch 18, once the latter has disconnected the circuit of motor 14 at the end of the travel of the latter. When arm 22 has moved into the projection position, lever 43 acts on a switch 47 (FIGS. 3 and 6) which disconnects the circuit of motor 42, thereby bringing the same to a stop.

While disconnecting the circuit of motor 42, switch 47 closes the circuit of the motor 48 which drives a pressure roller 43a, thus causing film 13 to move past the projection lamp 21 from the supply reel 25a to the take-up reel 25.

Figure 7:
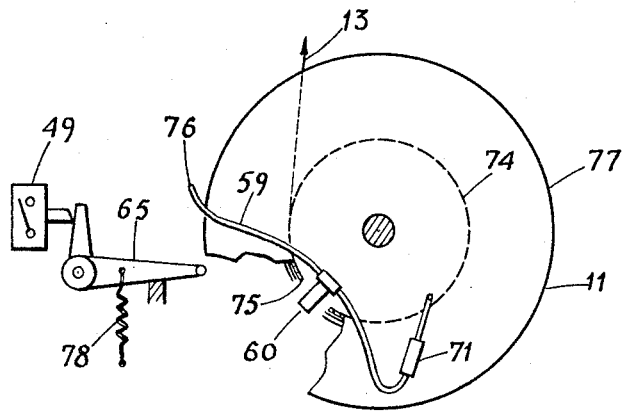
FIG. 7 illustrates the film unwinding stopping device.

An unwinding stop device, an embodiment of which will be described hereinafter, actuates a switch 49 (FIGS. 6 and 7) which disconnects the circuit of motor 48. The same switch closes the circuit of a winding-motor 50 which re-winds film 13 on reel 25a.

Figure 4:
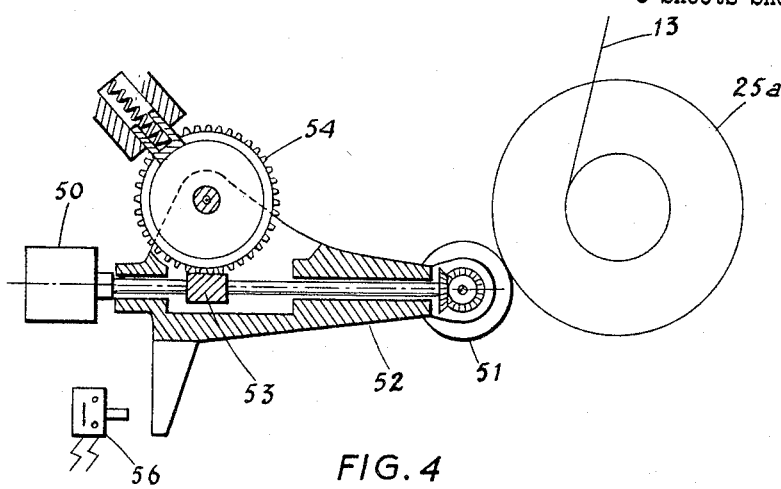
FIG. 4 shows a detail of the film rewinding device.

Motor 50 drives a winding-roller 51 (FIG. 4), roller 51 and motor 50 being mounted on an arm 52, pivoted on frame 24 of the projector. Motor 50 also drives a worm-gear 53 which meshes with a gear 54 frictionally mounted on frame 24. Arm 52 and gear 54 may be mounted in magazine 2. The circuit of motor 50 comprises a switch 55 controlled by arm 52. It also comprises a switch 56 which reverses the rotation direction of motor 50 and which is actuated by a winding stop device to be described later.

The loading motor 42 is connected in another circuit which causes it to rotate in the direction corresponding to the lifting direction of the loading arm 22. This circuit is closed by a switch 57 actuated by the unwinding stop device and is disconnected by a switch 58 which is actuated by lever 43 upon completion of its return travel.

It has been indicated that a winding stop device stops motor 48 by actuating switch 49 when the film has been completely unwound and that an unwinding stop device stops motor 50 by actuating switch 55 when the film has been wound again on reel 25a. An embodiment of such devices will now be described, with reference to FIGS. 7 and 10.

Figure 9:
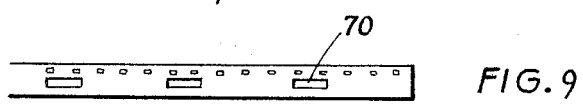
FIG. 9 shows the end portion of the film.

Film 13 is formed at both ends with perforations 70 (FIG. 9) extending over a length equal to a plurality of circumferences of hub 74 of reels 11 and 12. The pitch of these perforations is equal to the hub circumference. There may be, for example, three such perforations.

Figure 10:
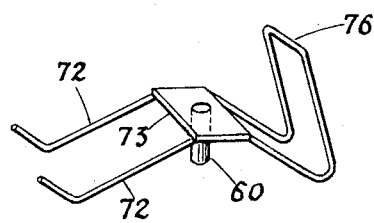
FIG. 10 shows a detail of the devices illustrated in FIGS. 7 and 8.

Each supply reel 11 is provided with a spring 59, shaped somewhat as a hair-pin, as shown in FIG. 10, and secured to the flanges 77 of the reel, for example by means of clips 71. The arms 72 of spring 59 are connected by means of a plate 73 which extends through the hollow hub 74 of the reel, from end to end, and carries an outwardly directed finger 60. An opening 75 is formed in hub 74 opposite finger 60. When the film is wound on the reel finger 60, which normally projects through opening 75, yields under the pressure of the film turns. Spring 59 is thus depressed and the end 76 thereof does not project beyond the periphery of the flanges 77 of the reel. However, when the film is nearly totally unwound finger 60 is no longer held within hub 74 and the end 76 of spring 59 projects beyond the flanges 77 and displaces in the counterclockwise direction a lever member 65 which is biased by a spring 78 in the clockwise direction. Lever 65 actuates a switch 49 causing the projector motor 48 to stop and thus stopping the unwinding of the film.

Figure 8:
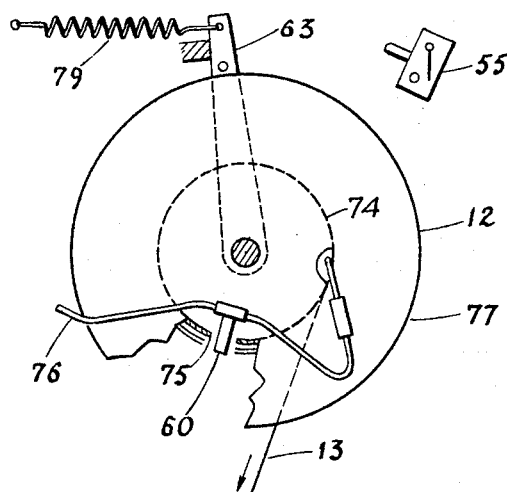
FIG. 8 illustrates the film winding stopping device.

The system which stops the rewinding of the film on the supply reel 11 is entirely similar and is mounted on the take-up reel 12. It is shown in FIG. 8 wherein the same references are used as in FIG. 7. The only difference is that, during the rewinding, the reels rotate at a much higher speed than during the projection. It will therefore be necessary to damp the shock of spring 59 against the lever member which it controls. To this end, spring 59 does not act directly on switch 55. It ac-tuates an arm 63, which is mounted for idly rotating about the axis of reel 12 and is biased in the anticlockwise direction by a comparatively strong tension spring 79. Arm 63 has to describe an arc of a circle, against the action of spring 79, before it contacts switch 55 which reverses the rotation of motor 50.

The operation of the device will now be described with particular reference to FIG. 6:

(a) A coin or token is first inserted into the slot of the collector box 19. This makes the operation of the device possible, for example by closing a general switch 80.

(b) Knob 17 is brought into the position corresponding to the film 13 which has been selected. Button 20 is depressed, closing the circuit of the motor 14 which drives magazine 2 and the operating cycle begins. Motor 14 brings film 13 into the projection position and, at the end of the travel, opens its own circuit by acting on switch 18.

(c) The film is now in position. While disconnecting the circuit of the motor which drives magazine 2, switch 18 has closed the circuit of the loading motor 42 which applies the loading arm 22 to the film 13, which has been selected and brought into the projection position.

During its travel, arm 22 first engages film 13 through rollers 28 and 29, in its upper portion, as shown in FIG. 2, just below the take-up reel 25. The film is thus wrapped about sprocket 27 and a length of the film is unwound from both reels 25 and 25a, the reels being, preferably, mounted on their respective axis by means of helical springs 81, so as to reduce the stress on the film, while yielding the film length necessary for assuring an intimate contact between film 13 and sprocket 27, whose teeth engage the perforations of the film. The loading arm, while continuing its travel, brings arm 38 in contact with the film which causes the film to engage sprocket 36. The tensioning arm 31 comes in turn into action and the film is thus definitely positioned in the projection position, as shown in FIG. 3.

(d) At this instant, lever 43 actuates switch 47 disconnecting the circuit of the loading motor 42 and closing the circuit of the projector motor 48. If the stress exerted on the tensioning arm 31 is normal, the projection will begin. If it is not sufficient, for example because the perforations in the film are not properly engaged by the sprockets, switch 34 disconnects the circuit of motor 48 and closes an additional circuit of the loading motor 42, so as to cause it to repeat the loading operation until the desired tension on the film is obtained.

(e) When the film is entirely unwound, spring 59 of the supply reel 25a actuates switch 49, which disconnects the projector motor 48, and switch 57, which starts motor 42 in the direction of the lifting of load arm 22. When arm 22 is lifted, lever 43 actuates switch 58, causing motor 42 to stop.

(f) While disconnecting the circuit of projector motor 48, switch 49 has completed the circuit of the winding motor 50. When the film is nearly entirely transferred from take-up reel 25 onto supply reel 25a, spring 59 of reel 25 causes the direction of rotation of motor 50 to be reversed by closing switch 55 and opening switch 49. This causes arm 52 to pivot and to actuate switch 56, bringing motor 50 to a stop.

The device is now at rest and may be started again with the same film or with another one.

During the operation of the device, the image from the film is projected on mirror 90. In the case of the above mentioned projector of the RG 16 type, the image is reflected by an oscillating mirror 91 with which this apparatus is fitted. From mirror 90, the image is projected onto screen 92. The sound signals are directed into an amplifier 93 and then to a loudspeaker 94. All these elements are entirely conventional.

Of course, the diagram of FIG. 6 is purely schematic and is aimed only at better setting forth the sequential nature of the operation of the device. It is, of course, clear that, while some of the switches are open in this rest position, others are open in their active position. The arrangement of such a circuit is of course obvious for those skilled in the art.

It is apparent that the device according to the invention offers many advantages which are mainly due to the cooperation of magazine 2 with the loading arm 22. The magazine is vertically disposed, thus reducing the tension of the film in rest position, while ensuring a good balance of the magazine in any position thereof, even though it is not entirely loaded. On the other hand, the magazine is entirely open at the top thereof, thus allowing easy access to the projector, whether the loading arm is raised or lowered. Moreover, the discharge of hot air is facilitated.

It will also be noted that the whole of the unit is formed by individually organized sub-assemblies. This is of great advantage as to the manufacture and the maintenance. The operation of the unit is entirely sequential, the starting of one operational step being conditioned by a normal completion of the preceding operational step. This is obviously of great advantage in so far as the security of operation is concerned.

It is to be understood that the invention is in no way limited to the embodiment described and illustrated which is given only by way of example.

What is claimed is:

1. A device for selectively projecting one of a plurality of films on a screen, said device comprising, in combination, a magazine shaped as a generally circular lantern, means mounting said magazine for rotation about the vertical axis thereof, a plurality of pairs of takeup reels mounted on said magazine, one reel of each pair being mounted adjacent the top of said magazine and the other adjacent the base thereof, a film extending from the base reel of each pair to the top reel of said pair, said film normally lying in a plane substantially tangent to the periphery of said lantern shaped magazine, a projector comprising a body portion mounted in a fixed position relative to said magazine and an arm portion pivotally mounted on said body portion and lying within the periphery of said magazine, a driving sprocket mounted on said body portion, a film track mounted on said body portion, a projection lamp and a pair of idler rollers mounted on said arm portion, said idler rollers being spaced to lie at the ends of a diameter of said driving sprocket when said arm is pivoted to thereby cause said film to be moved out of its normal path and into engagement with a major portion of the periphery of said driving sprocket and into position against said film track and means for causing pivotal movement of said arm in one direction to cause a selected film to be projected in an opposite direction to permit rotation of said magazine to position a newly selected film for projection.

2. A device for selectively projecting one of a plurality of films on a screen, said device comprising, in combination, a magazine shaped as a generally circular lantern, means mounting said magazine for rotation about the vertical axis thereof, a plurality of pairs of takeup reels mounted on said magazine, one reel of each pair being mounted adjacent the top of said magazine and the other adjacent the base thereof, a film extending from the base reel of each pair to the top reel of said pair, said film normally lying in a plane substantially tangent to the periphery of said lantern shaped magazine, a projector comprising a body portion mounted in a fixed position relative to said magazine and an arm portion pivotally mounted on said body portion and lying within the periphery of said magazine, a driving sprocket mounted on said body portion, a film track mounted on said body portion, a projection lamp and a pair of idler rollers mounted on said arm portion, said idler rollers being spaced to lie at the ends of a diameter of said driving sprocket when said arm is pivoted to thereby cause said film to be moved out of its normal path and into engagement with a major portion of the periphery of said driving sprocket and into position against said film track, means for causing pivotal movement of said arm in one direction to cause a selected film to be projected and in an opposite direction to permit rotation of said magazine to position a newly selected film for projection, and means mounted on said projector body portion for frictionally driving the takeup reel associated with the film being projected.

3. A device for selectively projecting one of a plurality of films on a screen, said device comprising, in combination, a magazine shaped as a generally circular lantern, means mounting said magazine for rotation about the vertical axis thereof, a plurality of pairs of takeup reels mounted on said magazine, one reel of each pair being mounted adjacent the top of said magazine and the other adjacent the base thereof, a film extending from the base reel of each pair to the top reel of said pair, said film normally lying in a plane substantially tangent to the periphery of said lantern shaped magazine, a projector comprising a body portion mounted in a fixed position relative to said magazine and an arm portion pivotally mounted on said body portion and lying within the periphery of said magazine, a driving sprocket mounted on said body portion, a film track mounted on said body portion, a projection lamp and a pair of idler rollers mounted on said arm portion, said idler rollers being spaced to lie at the ends of a diameter of said driving sprocket when said arm is pivoted to thereby cause said film to be moved out of its normal path and into engagement with a major portion of the periphery of said driving sprocket and into position against said film track, means for causing pivotal movement of said arm in one direction to cause a selected film to be projected and in an opposite direction to permit rotation of said magazine to position a newly selected film for projection, means mounted on said projector body portion for frictionally driving the takeup reel associated with the film being projected, control means for said projector arm portion and means normally held inoperative by film wound on the supply reel associated with the film being projected for operating said control means when the film is substantially unwound from said supply reel.

4. A device for selectively projecting one of a plurality of films on a screen, said device comprising, in combination, a magazine shaped as a generally circular lantern, means mounting said magazine for rotation about the vertical axis thereof, a plurality of pairs of takeup reels mounted on said magazine, one reel of each pair being mounted adjacent the top of said magazine and the other adjacent the base thereof, a film extending from the base reel of each pair to the top reel of said pair, said film normally lying in a plane substantially tangent to the periphery of said lantern shaped magazine, a projector comprising a body portion mounted in a fixed position relative to said magazine and an arm portion pivotally mounted on said body portion and lying within the periphery of said magazine, a driving sprocket mounted on said body portion, a film track mounted on said body portion, a projection lamp and a pair of idler rollers mounted on said arm portion, said idler rollers being spaced to lie at the ends of a diameter of said driving sprocket when said arm is pivoted to thereby cause said film to be moved out of its normal path and into engagement with a major portion of the periphery of said driving sprocket and into position against said film track, means for causing pivotal movement of said arm in one direction to cause a selected film to be projected and in an opposite direction to permit rotation of said magazine to position a newly selected film for projection, means for rewinding a projected film on the associated supply reel and means operated by said projector arm portion as it reaches its extreme of pivotal movement in said opposite direction for initiating operation of said rewinding means.

5. A device for selectively projecting one of a plurality of films on a screen, said device comprising, in combination, a magazine shaped as a generally circular lantern, means mounting said magazine for rotation about the vertical axis thereof, a plurality of pairs of takeup reels mounted on said magazine, one reel of each pair being mounted adjacent the top of said magazine and the other adjacent the base thereof, a film extending from the base reel of each pair to the top reel of said pair, said film normally lying in a plane substantially tangent to the periphery of said lantern shaped magazine, a projector comprising a body portion mounted in a fixed position relative to said magazine and an arm portion pivotally mounted on said body portion and lying within the periphery of said magazine, a driving sprocket mounted on said body portion, a film track mounted on said body portion, a projection lamp and a pair of idler rollers mounted on said arm portion, said idler rollers being spaced to lie at the ends of a diameter of said driving sprocket when said arm is pivoted to thereby cause said film to be moved out of its normal path and into engagement with a major portion of the periphery of said driving sprocket and into position against said film track, means for causing pivotal movement of said arm in one direction to cause a selected film to be projected and in an opposite direction to permit rotation of said magazine to position a newly selected film for projection, a bracket pivotally mounted on said projector body portion, drive means mounted on said bracket, a roller driven by said drive means, said roller engaging the periphery of a reel associated with a projected film when said bracket is in one extreme of its pivotal movement, a gear rotatably mounted on the pivotal mounting of said bracket, friction means engaging said gear, a worm wheel engaging said gear and means driving said worm wheel from said driving means whereby upon energization of said driving means said bracket rotates about its pivot to cause said roller to engage said supply reel and said roller thereafter drives said wheel and said gear.

6. A device for selectively projecting one of a plurality of films on a screen, said device comprising, in combination, a magazine shaped as a generally circular lantern, means mounting said magazine for rotation about the vertical axis thereof, a plurality of pairs of takeup reels mounted on said magazine, one reel of each pair being mounted adjacent the top of said magazine and the other adjacent the base thereof, a film extending from the base reel of each pair to the top reel of said pair, said film normally lying in a plane substantially tangent to the periphery of said lantern shaped magazine, a projector comprising a body portion mounted in a fixed position relative to said magazine and an arm portion pivotally mounted on said body portion and lying within the periphery of said magazine, a driving sprocket mounted on said body portion, a film track mounted on said body portion, a projection lamp and a pair of idler rollers mounted on said arm portion, said idler rollers being spaced to lie at the ends of a diameter of said driving sprocket when said arm is pivoted to thereby cause said film to be moved out of its normal path and into engagement with a major portion of the periphery of said driving sprocket and into position against said film track, means for causing pivotal movement of said arm in one direction to cause a selected film to be projected and in an opposite direction to permit rotation of said magazine to position a newly selected film for projection, a bracket pivotally mounted on said projector body portion, drive means mounted on said bracket, a roller driven by said drive means, said roller engaging the periphery of a reel associated with a projected film when said bracket is in one extreme of its pivotal movement, a gear rotatably mounted on the pivotal mounting of said bracket, friction means engaging said gear, a worm wheel engaging said gear, means driving said worm wheel from said driving means whereby upon energization of said driving means said bracket rotates about its pivot to cause said roller to engage said supply reel and said roller thereafter drives said wheel and said gear, and means operated by said projector arm portion as it reaches its extreme of movement in said opposite direction for initiating operation of said driving means.

7. A device for selectively projecting one of a plurality of films on a screen, said device comprising, in combination, a magazine shaped as a generally circular lantern, means mounting said magazine for rotation about the vertical axis thereof, a plurality of pairs of takeup reels mounted on said magazine, one reel of each pair being mounted adjacent the top of said magazine and the other adjacent the base thereof, a film extending from the base reel of each pair to the top reel of said pair, said film normally lying in a plane substantially tangent to the periphery of said lantern shaped magazine, a projector comprising a body portion mounted in a fixed position relative to said magazine and an arm portion pivotally mounted on said body portion and lying within the periphery of said magazine, a driving sprocket mounted on said body portion, a film track mounted on said body portion, a projection lamp and a pair of idler rollers mounted on said arm portion, said idler rollers being spaced to lie at the ends of a diameter of said driving sprocket when said arm is pivoted to thereby cause said film to be moved out of its normal path and into engagement with a major portion of the periphery of said driving sprocket and into position against said film track, means for causing pivotal movement of said arm in one direction to cause a selected film to be projected and in an opposite direction to permit rotation of said magazine to position a newly selected film for projection, a bracket pivotally mounted on said projector body portion, drive means mounted on said bracket, a roller driven by said drive means, said roller engaging the periphery of a reel associated with a projected film when said bracket is in one extreme of its pivotal movement, a gear rotatably mounted on the pivotal mounting of said bracket, friction means engaging said gear, a worm wheel engaging said gear, means driving said worm wheel from said driving means whereby upon energization of said driving means said bracket rotates about its pivot to cause said roller to engage said supply reel and said roller thereafter drives said wheel and said gear, means operated by said projector arm portion as it reaches its extreme of movement in said opposite direction for initiating operation of said driving means, means normally held inoperative by film on said associated takeup reel, said means being released when said takeup reel becomes substantially empty, and control means operated by said takeup reel means for reversing the direction of operation of said bracket mounted drive means to thereby disengage said roller from said supply reel.

8. A device for selectively projecting one of a plurality of films on a screen, said device comprising, in combination, a magazine shaped as a generally circular lantern, means mounting said magazine for rotation about the vertical axis thereof, a plurality of pairs of takeup reels mounted on said magazine, one reel of each pair being mounted adjacent the top of said magazine and the other adjacent the base thereof, a film extending from the base reel of each pair of the top reel of said pair, said film normally lying in a plane substantially tangent to the periphery of said lantern shaped magazine, a projector comprising a body portion mounted in a fixed position relative to said magazine and an arm portion pivotally mounted on said body portion and lying within the periphery of said magazine, a driving sprocket mounted on said body portion, a film track mounted on said body portion, a projection lamp and a pair of idler rollers mounted on said arm portion, said idler rollers being spaced to lie at the ends of a diameter of said driving sprocket when said arm is pivoted to thereby cause said film to be moved out of its normal path and into engagement with a major portion of the periphery of said driving sprocket and into position against said film track, means for causing pivotal movement of said arm in one direction to cause a selected film to be projected and in an opposite direction to permit rotation of said magazine to position a newly selected film for projection, a bracket pivotally mounted on said projector body portion, drive means mounted on said bracket, a roller driven by said drive means, said roller engaging the periphery of a reel associated with a projected film when said bracket is in one extreme of its pivotal movement, a gear rotatably mounted on the pivotal mounting of said bracket, friction means engaging said gear, a worm wheel engaging said gear, means driving said worm wheel from said driving means whereby upon energization of said driving means said bracket rotates about its pivot to cause said roller to engage said supply reel and said roller thereafter drives said wheel and said gear, means operated by said projector arm portion as it reaches its extreme of movement in said opposite direction for initiating operation of said driving means, means normally held inoperative by film on said associated takeup reel, said means being released when said takeup reel becomes substantially empty, control means operated by said takeup reel means for reversing the direction of operation of said bracket mounted drive means to thereby disengage said roller from said supply reel, and means operated upon return of said bracket to its initial pivotal position to stop said bracket mounted drive means.

9. A device for selectively projecting one of a plurality of films on a screen, said device comprising, in combination, a magazine shaped as a generally circular lantern, means mounting said magazine for rotation about the vertical axis thereof, a plurality of pairs of takeup reels mounted on said magazine, one reel of each pair being mounted adjacent the top of said magazine and the other adjacent the base thereof, a film extending from the base reel of each pair to the top reel of said pair, said film normally lying in a plane substantially tangent to the periphery of said lantern shaped magazine, a projector comprising a body portion mounted in a fixed position relative to said magazine and an arm portion pivotally mounted on said body portion and lying within the periphery of said magazine, a driving sprocket mounted on said body portion, a film track mounted on said body portion, a projection lamp and a pair of idler rollers mounted on said arm portion, said idler rollers being spaced to lie at the ends of a diameter of said driving sprocket when said arm is pivoted to thereby cause said film to be moved out of its normal path and into engagement with a major portion of the periphery of said driving sprocket and into position against said film track, manually operable means for causing said magazine to rotate to bring a selected one of said films into position between said projector portions, means for causing pivotal movement of said arm in one direction to cause a selected film to be projected and in an opposite direction to permit rotation of said magazine to position a newly selected film for projection, means operated when said magazine is positioned to project a selected film for energizing said last mentioned means to move said projector arm in said one direction, driving means for said film driving sprocket mounted on said projector body portion, takeup reel driving means also mounted on said projector body portion, means operated by said projector arm portion as it reaches its limit of movement in said one direction for energizing said sprocket driving means and said takeup reel driving means, a bracket pivotally mounted on said projector body portion, drive means mounted on said bracket, a roller driven by said drive means, said roller engaging the periphery of a reel associated with a projected film when said bracket is in one extreme of its pivotal movement, a gear rotatably mounted on the pivotal mounting of said bracket, friction means engaging said gear, a worm wheel engaging said gear, means driving said worm wheel from said driving means whereby upon energization of said driving means said bracket rotates about its pivot to cause said roller to engage said supply reel and said roller thereafter drives said wheel and said gear, means operated by said projector arm portion as it reaches its extreme of movement in said opposite direction for initiating operation of said driving means, means normally held inoperative by film on said associated takeup reel, said means being released when said takeup reel becomes substantially empty, control means operated by said takeup reel means for reversing the direction of operation of said bracket mounted drive means to thereby disengage said roller from said supply reel, and means operated upon return of said bracket to its initial pivotal position to stop said bracket mounted drive means.

References Cited in the file of this patent

UNITED STATES PATENTS

| | | |
|---|---|---|
| 2,200,681 | Rollings | May 14, 1940 |
| 2,290,071 | Rinaldy | July 14, 1942 |
| 2,998,748 | Dessilani | Sept. 5, 1961 |

FOREIGN PATENTS

| | | |
|---|---|---|
| 1,218,054 | France | Dec. 14, 1959 |